and Robert H.

United States Patent

[11] 3,617,292

[72] Inventors George M. Gantz
Upper Saddle River, N.J.;
E. Scudder Mackey, Binghamton, N.Y.;
Raymond L. Mayhew, Summit, N.J.
[21] Appl. No. 625,035
[22] Filed Mar. 22, 1967
[45] Patented Nov. 2, 1971
[73] Assignee GAF Corporation
New York, N.Y.

[54] COATING COMPOSITIONS COMPRISING A COLLOID AND A POLYOXYALKYLENE ETHER OF A MONOHYDRIC ALCOHOL CONTAINING MORE THAN TWO ALKYL SIDE CHAINS
10 Claims, No Drawings

[52] U.S. Cl. .................................................... 96/114.5,
96/67, 96/87, 106/125
[51] Int. Cl. ...................................................... G03c 1/38
[50] Field of Search .......................................... 96/94,
114.5, 67; 106/125; 260/638 HF

[56] References Cited
UNITED STATES PATENTS
2,965,678 12/1960 Sundberg et al. .............. 260/638
2,768,894 10/1956 Harriman ...................... 96/94

Primary Examiner—J. Travis Brown
Attorneys—George L. Tone, Samson B. Leavitt, Homer J. Bridger, Martin A. Levitin, Walter C. Kehm and Robert H. Zappert ABSTRACT: A coating composition and a photographic support coated therewith, said coating composition comprising a water-permeable colloid and a coating aid comprising a polyoxyalkylene ether of a primary monohydric saturated aliphatic alcohol containing more than two alkyl side chains, said alcohol having the molecular configuration of an alcohol produced by the oxo process, said ether containing from 2 to 20 oxyalkylene groups per mole.

COATING COMPOSITIONS COMPRISING A COLLOID AND A POLYOXYALKYLENE ETHER OF A MONOHYDRIC ALCOHOL CONTAINING MORE THAN TWO ALKYL SIDE CHAINS

This invention relates to coating compositions comprising a water-permeable colloid and more particularly, to gelatin coating compositions advantageously adapted for use in connection with high-speed coating methods.

As is commonly recognized in the coatings industry, it is highly desirable, if not essential, that water-permeable colloid, e.g., gelatin, containing coating compositions be capable of application at relatively high coating speeds, and that the layers so deposited be of uniform and selected physical characteristics. The foregoing requirements are of primary import in operations associated with the preparation of photographic film elements. Ideally, coating aids contemplated for use in water-permeable colloid-containing compositions and especially those containing gelatin should:

1. Be of uniform quality, properties, etc. from batch to batch;
2. Enable the use of high-speed coating operations both in wet-on-wet and wet-on-dry coatings;
3. Be devoid of any tendency to impart streakiness or repellency to the water-permeable colloid;
4. Exhibit minimal sludge and/or foam formation;
5. Produce coatings having little or no tendency to slip;
6. Be nonphotoactive Heretofore, considerable difficulty has been encountered in connection with attempts to provide water-permeable colloid layers of the desired characteristics while utilizing coating speeds which are consonant with feasible commercial operation and satisfactory product throughput. With gelatin compositions for example, and to which no auxiliary coating aid has been added, there are invariably obtained coated layers which exhibit manifold defects including e.g., the presence of numerous crescent-shaped uncoated areas, also referred to as repellency spots, such defects approximating the size of a pinhead with streaks or other such irregularities emanating from the points of the crescent and proceeding in a direction opposite to that of the coating. It is not unusual to find that lightly coated areas of 5–10 mm. in diameter will result.

In an effort to overcome or otherwise mitigate the foregoing and related disadvantages, the art has resorted to the use of a wide variety of coating aids. Saponin for example, despite its relatively widespread use as a coating aid in gelatin compositions of various types has nevertheless proved somewhat unsatisfactory. Although yielding a relatively uniform and even coating, this material being of natural origin, may often vary markedly from batch to batch in quality, composition, purity and the like, to the extent that one or more of the properties required in the photographic emulsion may be deleteriously affected in the absence of remedial procedures designed to compensate for such shortcomings e.g. the addition of auxiliary ingredients which function to suppress or neutralize any fugitive behavior of the coating aid.

As a consequence, considerable industrial attention has been focused upon the development of synthetic-type coating aids selected from a wide variety of surfactant materials of the anionic, cationic and/or nonionic types; representative compounds promulgated for such purposes include, for example, the taurides, betaines, imidazolinium salts, and the like. Since materials of the latter type may be subjected to relatively precise conditions of controlled manufacture, problems associated with variations in quality, composition, purity and the like are minimized, if not completely eliminated. Despite the advantages accruing with the use of the synthetic coating aids heretofore provided the results have nevertheless been unsatisfactory in a number of important respects. As examples of the more important difficulties repeatedly encountered with the use of the latter materials and especially in connection with the preparation of photographic layers containing gelatin, there may be mentioned their tendency to produce streakiness and repellency spots that cannot be readily rewet with the consequent condition that the product tends to form "air-bells" on the emulsion surface during photographic processing. Such areas will often manifest themselves in the form of relatively small, undeveloped areas in the processed product due to the fact that in such areas the developer is incapable of penetrating into the emulsion layer. These defects are not only unsightly to the extent that retouching of the negative is often required, but more importantly, can be dangerously misleading when present on certain types of films particularly medical or industrial X-ray films.

The foregoing and related problems becomes increasingly manifest in connection with "wet-on-wet" coating methods wherein the water-permeable colloid composition is applied to a wet substrate. The latter is, of course, a matter of prime commercial importance and especially in connection with plural coating operations wherein it is of utmost importance to eliminate any necessity for drying and thus the time which would otherwise be consumed thereby.

However, with the use of the coating aids heretofore provided, the "one pass-wet-on-wet" technique is found to be substantially inapplicable and accordingly, it becomes necessary to dry an applied layer prior to the application of an additional layer. The practical and economic disadvantages thus accruing can be made readily manifest by the following discussion. In the manufacture of photographic film elements comprising a film base coated with one or more light-sensitive layers, e.g., gelatin-silver halide emulsion compositions, it is recognized practice to include additional nonsensitized layers, e.g., subbing, anticurl and anti-abrasion layers, for purposes of promoting structural stability or otherwise augmenting those properties essential to efficacious film usage and processing. Thus, it is conventional practice to provide a light-sensitive emulsion layer with a suitable surface layer in order to preserve both the sensitivity as well as physical characteristics of the emulsion layer as well as for insuring against the acquisition and retention of static electrical charge by the film element. Such surface layers are commonly referred to in the art as anti-abrasion antistatic layers, etc. Coating operations incident to the provision of such layers usually involve the deposition of two or more hydrophilic colloid-containing layers, such as gelatin. Quite obviously the applicability of wet-on-wet coating techniques greatly facilitates the successive coating operations inherently involved. It has also been observed that those coating aids which to some extent permit the use of wet-on-wet coating operations, albeit under rather stringent and predetermined conditions, nevertheless prove in the vast majority of instances to be notoriously deficient when the coating method employed is of the high-speed type involving the air doctor technique.

Thus, a primary object of the present invention resides in the provision of improved water-permeable colloid containing coating compositions which are substantially devoid of the above disadvantages.

Another object of the present invention resides in the provision of improved gelatin coating compositions advantageously adapted for application via the use of high speed coating techniques.

A further object of the present invention resides in the provision of coating aids for use with photosensitive gelatin emulsion compositions to facilitate the attainment of coatings which are uniform and repellency-free without deleteriously affecting the emulsion.

Other and related objects of the present invention will become apparent hereinafter as the description thereof proceeds.

The attainment of the foregoing and related objects is made possible in accordance with the present invention which, in its broader aspects includes the provision of improved water-permeable colloid compositions containing as an essential ingredient a coating aid comprising a polyoxyalkylenated derivative of a primary monohydric saturated aliphatic alcohol containing from eight to 10 carbon atoms said alcohol containing more than two alkyl side chains and having the molecular configuration of an alcohol produced by the oxo process from a mono-olefinic hydrocarbon of seven to nine carbon atoms containing at least two alkyl side chains said ether containing from two to 20 oxyalkylene groups per mole. Thus, the compounds contemplated for use herein as coating aids may be represented according to the following structural formula:

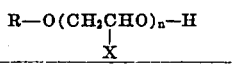

wherein R represents alkyl containing from eight to ten carbon atoms containing more than two alkyl side chains, X represents hydrogen or methyl and $n$ represents a positive integer of from two to 20 inclusive.

The compounds encompassed by the above depicted structural formula as well as methods for their preparation are described for example in U.S. Pat. No. 2,965,678. As explained therein, the oxo-alcohol employed as a starting material for polyoxyalkylation is prepared by the catalytic reaction of an olefin with carbon monoxide and hydrogen to form an aldehyde, the latter being thereafter subjected to catalytic reduction whereby to form the corresponding alcohol, such process being known commercially as the oxo process. The relatively specific and delimited class of polyoxyalkylenated oxo-alcohol compounds contemplated for use in accordance with the present invention embrace those compounds prepared from mono-olefinic hydrocarbons containing from seven to nine carbon atoms. As particular examples of branched chain primary aliphatic alcohols suitable for preparing the polyoxyalkylenated products of the above formula there may be mentioned the following:

2,3,3-trimethyl-1-pentanol
2,2,3-trimethyl-1-pentanol
2,3,4-trimethyl-1-pentanol
2,3,4,4-tetramethyl-1-pentanol
2,3,5-trimethyl-1-hexanol
2,3,4,5-tetramethyl-1-hexanol
2-methyl-3,4-diethyl-1-pentanol . . . etc.

The starting alcohols employed in producing the compounds of this invention may be condensed with the required number of moles of ethylene oxide or propylene oxide or a mixture of the two oxides in known manner according to the general methods illustrated in U.S. Pat. Nos. 1,970,578 and 2,174,761, for example. The condensation is preferably carried out under elevated temperatures and pressures and may be catalyzed by quaternary hydroxides, amines, or acidic and coordinating type compounds, although the strong alkaline catalysts such as KOH or NaOH and the like are preferred because of the fewer by products formed and the more easily controllable reaction conditions.

One of the truly surprising aspects to the discovery forming the basis of the present invention relates to the observation that the improved coating properties made possible are uniquely typical of those polyoxyalkylenated derivatives obtained with the $C_8-C_{10}$ oxo-alcohols in particular, i.e., to the exclusion of even closely related homologous compounds. This seeming atypicality becomes even more acutely evident with high speed coating operations, i.e., the polyoxyalkylenated derivatives of the $C_8-C_{10}$ oxo-alcohols display a remarkable capacity to impart optimum properties to the coating composition despite subjection to coating speeds considerably in excess of those which may normally and efficaciously be used. Thus, it is found that the present invention makes possible the use of coating speeds up to 3 times those conventionally employed as a matter of necessity due to the inherent limitations characterizing the coating aid compounds heretofore provided in the art. Moreover, coating compositions containing polyoxyalkylenated derivatives of homologous oxo-alcohols are found to yield intolerable quantities of repellency spots as well as other coating irregularities despite the use of coating speeds which approximate but a fraction of those made possible by the present invention.

Although specific reference will be made to gelatin throughout the present description, the term water-permeable colloid as used herein is to be understood as encompassing water-soluble and/or dispersible materials whose aqueous solutions yield water-permeable films or drying. As examples of substances coming within this definition there may be mentioned in particular and without limitation water-soluble cellulose esters of lactic or glycolic acid, partially hydrolyzed polyvinyl acetate, modified polyvinyl alcohol, water-soluble polyvinyl acetals, etc. The colloid may also be suitably provided in the form of an aqueous dispersion, emulsion, suspension, etc., such as would be the case with polymers derived from the polymerization of one or more acrylate monomers, e.g., ethyl acrylate, methyl methacrylate, etc. The foregoing materials are conventionally provided in latex form by the use of suitable emulsifying agents, suspending agents or the like.

In accordance with the discovery forming the basis of the present invention, it has been ascertained that the improvements provided by the aforedescribed coating aids are obtained even though employed in relatively small quantities, i.e., on the order of 0.01 percent and lower by weight based on the weight of the coating solution. It should be understood, of course, that larger quantities may be employed to advantage, for example, in amounts ranging up to 0.1 percent and even 1 percent by weight based on the weight of the coating solution. The particular proportions employed will, of course, depend primarily on the ultimate use contemplated for the coating composition in question. Accordingly, the aforementioned concentrations are not particularly critical but serve only to define those proportions found to yield, in general, optimum results. For example, in those instances wherein the gelatin is to be incorporated directly into a photographic silver halide emulsion, the gelatin concentration will ordinarily range from about 2 to about 10 percent by weight of the emulsion composition with a range of 6 to 8 percent being preferred. Accordingly, the amount of polyoxyalkylenated oxo-alcohol employed will ordinarily correspond to a preferred range of from about 0.1 percent to about 5 percent by weight based on the dry weight of the colloidal carrier material, e.g., gelatin. Expressed in terms of coated area, the effective amounts of coating aids for use herein range from about 1 to about 50 milligrams per sq. ft. since 1 kilogram of gelatin, dry basis, will usually provide coverage for about 1,000 sq. ft. of surface.

The photographic emulsions prepared utilizing the coating aids of the present invention will ordinarily be comprised of an aqueous solution of gelatin containing as the light-sensitive material a silver salt such as silver bromide, silver chloride, silver iodide as well as mixtures thereof. Such emulsions may be of the nonoptically sensitized, orthochromatic, panchromatic or X-ray type. When preparing the photographic emulsion, the coating aid may be included either before or after the addition of any of the other ingredients conventionally employed in gelatin-silver halide emulsions, e.g., sensitizing dyes, hardeners, etc. The particular coating procedure employed may comprise any of the standard methods well established in the coatings industry. For example, the substrate to be coated may be passed through a through or other reservoir containing the coating solution. The coating may be applied to greater thickness than desired ultimately and thereafter subjected to the action of some leveling means such as a doctor blade or an air-brush which causes runback of the coating compositions thereby resulting in the obtention of an even surface. In some instances, the coating method may involve a hopper technique in which the thickness of the layer is regulated by the rate at which the coating composition is deposited upon the base which is transported in a direction adjacent thereto.

The following examples are given for purposes of illustrating the present invention and are not to be considered as being limitative thereof. In each of the examples, all parts given are by weight unless otherwise indicated.

EXAMPLE 1

A silver halide photographic emulsion having a silver concentration of approximately 35 grams per kilogram of emulsion and a gelatin concentration of approximately 70 grams per kilogram of emulsion is prepared. The emulsion is thereafter divided into four parts identified as samples (a), (b), (c), and (d) respectively. Sample (a) serves as control. To sample (b) is added 0.0005 part of a polyethoxylated compound obtained by the reaction of oxo-decanol with 18 moles of ethylene oxide. To sample (c) is added 0.001 part of saponin as coating aid. To sample (d) is added 0.0005 part of a polyethoxylated material obtained by the reaction of trimethyl nonanol with 6 moles of ethylene oxide. Each of the foregoing samples is thereafter coated onto a photographic cellulose acetate support via the air-doctor blade technique at a web speed of 120 ft. per minute. The quality of the coating obtained is evaluated in terms of population density of repellencies per unit area. Within the context of the present invention, the term "repellency" refers to uncoated areas whether in the form of dots, lines or other irregularities. The results of the repellency evaluations of each of the respective coated samples are itemized in the following table:

TABLE 1

| Coating Aid | Concentration/Unit of Coating Solution | Repellencies per 3 sq. ft. |
| --- | --- | --- |
| (a) Control | — | gross 10+ |
| (b) Oxodecyl alcohol +18 moles ethylene oxide | 0.0005 part | None |
| (c) Saponin | 0.001 part | 3 |
| (d) Trimethyl Nonanol +6 moles ethylene oxide | 0.0005 part | 10+ |

Of special interest are the results obtained in connection with sample (d) wherein the coating aid comprises the reaction product of trimethyl nonanol with 6 moles of ethylene oxide. As will be observed, this particular compound is ascertained to be highly offensive in view of the rather high repellency density. Such compound deserves special mention since it comprises a higher homolog to the compounds of the present invention, being prepared from a $C_{12}$ primary aliphatic alcohol of the oxo-type. Despite the close similarity of such compound, the results make manifestly clear that a rather remarkable improvement in the capacity to impart optimum coating properties attends an even slight variation in the nature of the alcohol employed. The trimethyl nonanol derivative would, of course, be eminently unsuitable for use in the preparation of photographic elements intended to provide a reliable an unimpeachable source of the information reproduced i.e., critically dependent upon accuracy of reproduction as would be the case for example with medical X-ray films due to the rather high population density of repellencies. In fact, as the above summarized data clearly establishes the use of Saponin, albeit at a somewhat higher concentration, provides a final coating which is considerably superior to that obtained with the trimethyl nonanol derivative.

The following example illustrates the improvements obtainable when the coating aid is included as an additive to a photographic silver halide emulsion layer, the latter serving as a support for a subsequent overcoating layer.

EXAMPLE 2

To a silver halide photographic emulsion identical with that described in example 1 is added 0.0005 part of the reaction product obtained by the condensation of oxodecyl alcohol with 18 moles of ethylene oxide. The coating solution thus obtained is coated onto a cellulose acetate support of the type conventionally employed in the fabrication of photographic film elements, and chilled. Immediately upon completion of the chilling operation and without any drying, the emulsion layer is directly overcoated with a dilute, aqueous gelatin solution which serves as an anti-abrasion layer. The anti-abrasion layer is applied at a web coating speed in excess of 120 ft. per minute. Despite the exceptionally high coating speed employed, there were no indications of skipping. By way of comparison, the procedure is repeated with an additional sample of the identical silver halide emulsion composition but containing Saponin as the coating aid in lieu of the ethylene oxide/oxodecyl alcohol condensate. The overcoating operation is carried out in identical fashion, i.e., the chilled emulsion layer without drying is overcoated with an aqueous, gelatin anti abrasion composition. However, in this instance, coating speeds of only 35–40 ft. per minute were permitted since coating speeds even slightly in excess of 40 ft. per minute, gave rise to severe skipping with the inevitable consequence that the coated layer exhibited an intolerably high population density of repellencies. In contradistinction, the use of the oxodecyl alcohol/ethylene oxide condensate makes possible the attainment of a repellency-free anti-abrasion layer.

EXAMPLE 3

Example 2 is repeated except that the oxodecyl alcohol/ethylene oxide condensate is replaced by an equivalent amount of an oxo-nonyl alcohol/ethylene oxide (18 moles) condensate. The results obtained are similar to those described in example 2, i.e., the oxo-nonyl alcohol/ethylene oxide condensate makes possible the application of an anti-abrasion surface layer totally devoid of repellencies.

EXAMPLE 4

Example 2 is repeated except that the oxodecyl alcohol/ethylene oxide condensate is replaced with an equivalent amount of an oxo-octyl/ethylene oxide (18 moles) condensate. The results obtained clearly establish the superiority of the coating aid of the present invention as regards the ability to permit the high-speed deposition of gelatin surface layers to thereby provide a repellency-free coating.

Results similar to those described above are obtained when the procedures described are repeated but employing in lieu of the specific coating aids exemplified, polyether derivatives obtained by the reaction of a $C_8$–$C_{10}$ oxo-alcohols with varying molar proportions of ethylene oxide within the range hereinbefore specified. Similar advantage likewise attends the use of the polyoxypropylenated derivatives in lieu of the polyoxyethylenated derivatives.

Improvements similar to those described above are further obtained when the gelatin carrier is replaced wholly or partly with one or more other water-permeable colloids such as the water-soluble cellulose esters of lactic or glycolic acid, partially hydrolyzed polyvinyl acetate, modified polyvinyl alcohol, water-soluble acetals, etc.

In addition, it is found that gelatin coating compositions containing conventional coating aids of the type heretofore provided such as the taurides, protein condensation products of fatty acids, saponin, polyoxyethylene derivatives of long chain fatty acids, alcohols, etc., may be synergistically modified to advantage by including therein one or more of the coating aids provided by the present invention. Moreover, in lieu of saponin, other suitable surface active agents may be added such as sulfated oleic acid, dihexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid, and sulfonates of high molecular weight primary or secondary aliphatic, aromatic and cycloaliphatic carboxy acids.

In addition, the improvements provided by the present invention are also obtained with silver halide emulsions which contain color formers which are provided with a solubilizing sulfo or carboxy group, and therefore, soluble in alkali solutions, for instance, sodium hydroxide solutions. Such color formers which upon color development with a primary amino developer yield azomethine, quinonimine or azine dyes, are described in U.S. Pat. Nos. 2,186,734; 2,445,252; 2,530,349; 2,671,021; 2,524,725; 2,354,552 and 2,547,037.

Furthermore the color coupler may be of the nondiffusing type which, when added to the silver halide emulsion dispersed in a mixture of high boiling and low boiling solvents, forms packet-type emulsions with capsulated color formers. Such color formers are known to persons skilled in the art. Typical representatives are described in U.S. Pat. Nos. 2,186,852; 2,179,239; 2,179,244; 2,298,443; 2,369,489 and 2,511,231.

Although the present invention has been particularly described with reference to the preparation of photographic silver halide emulsions, it will be understood that the coating compositions provided by the present invention may comprise simply a mixture of gelatin with one or more of the oxo-alcohol/alkylene oxide condensates. Such compositions find utility in a wide variety of applications and may be applied as such to any number of substrate materials for purposes of providing a suitable overcoat. For example, they may be employed to advantage as protective coatings for paper, plastics such as films of cellulose nitrate, cellulose esters, e.g., cellulose acetate, cellulose acetate butyrate and the like. In addition, they may be applied in the form of antihalation layers, antistatic layers, filter layers or in any type of gelatin layers which is coated from a composition consisting essentially of an aqueous solution of gelatin. For example, gelatin coating compositions intended for use as auxiliary layers, surface layers, etc., will usually contain the gelatin in amounts approximating 2-3 percent by weight of the total composition. However, when employed in the preparation of photographic emulsions, it is usually advisable to employ larger proportions of coating aid than would customarily be employed in aqueous solutions of gelatin intended for use as simple over coatings. Moreover, in some instances, it may be advantageous to employ larger proportions even though the coating composition in question is intended for use as a simple auxiliary, i.e., nonphotographic layer. For example, larger proportions of coating aid are found to permit the more effective use of higher coating speeds. In general, increased proportions of coating aid are usually desirable where the gelatin is employed in minor concentrations. The pH of the coating composition would ordinarily fall within a range of about 5 to 8. For example, when utilizing the coating compositions described herein as auxiliary layers, e.g., as a noncurling layer in a photographic film element, an acid pH range is usually preferred.

This invention has been described with respect to certain preferred embodiments and there will become obvious to persons skilled in the art other variations, modifications, and equivalents which are to be understood as coming within the scope of the present invention.

What is claimed is:

1. A noncolorforming coating composition comprising a water-permeable colloid, and as a coating aid therein a polyoxyalkylene ether of a primary monohydric saturated aliphatic alcohol of eight to 10 carbon atoms and containing a straight chain alkyl group of five to six carbon atoms carrying three or four methyl or ethyl side chains, said ether containing from two to 20 oxyalkylene groups per mole.

2. A composition according to claim 1 wherein said alcohol contains 10 carbon atoms.

3. A composition according to claim 1 wherein said alcohol contains nine carbon atoms.

4. A composition according to claim 1 wherein said alcohol contains eight carbon atoms.

5. A composition according to claim 1 wherein said water-permeable colloid comprises gelatin.

6. A composition according to claim 5 wherein said gelatin comprises a gelatin-silver halide photographic emulsion.

7. An article of manufacture comprising a support coated with the composition of claim 1.

8. An article of manufacture according to claim 7 wherein said support comprises cellulose acetate.

9. An article of manufacture comprising a support coated with the composition of claim 6.

10. An article of manufacture according to claim 9 wherein said gelatin-silver halide emulsion layer is further overcoated with a gelatin surface layer.

* * * * *